Patented June 22, 1926.

1,589,532

UNITED STATES PATENT OFFICE.

WILLIAM H. HOODLESS, OF PHILADELPHIA, PENNSYLVANIA.

DECOLORIZING AND FILTERING MATERIAL AND ART OF PRODUCING THE SAME.

No Drawing.    Application filed March 10, 1921. Serial No. 451,347.

The diatomic silicious earth known commercially as kieselguhr and to the mineralogists, when in its native state, as diatomite, is used frequently as a filtering material. It is generally supposed to be the fossil remains of a low order of once living organisms termed diatoms, and is a silicious material the particles of which are highly and minutely porous. It is believed to be the silicious frame of the organism from which the other materials forming the bulk of the living creature have disappeared. Diatoms are generally believed to have been vegetable rather than animal in their nature.

The filtering properties of this material are remarkable, and its use has much increased in recent years. It does not, however, answer particularly well as a decolorizer, and hence, when it is used, a decolorizing stage in the process of treating many solutions is necessitated, requiring the use of another material as a decolorizer.

The product of my process is a kieselguhr that has deposited upon the walls of the frames of its highly and minutely porous particles a thin layer of carbon. This layer of carbon acts as the decolorizing medium. When so deposited the carbon is brought into very complete contact with the whole of the solution to be filtered and produces a more complete decolorization than any other substance heretofore known.

In order to produce this material I add to the kieselguhr a solution of molasses or other similar products of sugar manufacture the molecules of which can be broken up by heat with the vaporization of the non-carbon elements of these molecules and the deposit of some, at least, of the carbon upon the adjacent surfaces of non-volatilizable material. This solution is thin enough to penetrate into the particles of the kieselguhr. I use for this purpose a solution of "black strap" molasses, or other products of sugar refining of a like character.

After the kieselguhr is thoroughly permeated by the above mentioned material, (care should be taken that all layers of the kieselguhr are so permeated, the great filtering power of kieselguhr being taken into consideration) the mass is dried, (preferably, until sensible moisture is eliminated). The mass is then placed in a kiln or retort, and distilled destructively. This operation is carried out with a very limited supply of air or without access of air, and in the course of it the organic molecules of the sugar product are broken up and their non-carbon elements are volatilized and eliminated and a thin layer of carbon is deposited throughout and upon the frame of the porous kieselguhr particles. The temperature of the reaction is in practice very readily gauged. The gases arising from the retort have an unsatisfied affinity for oxygen, and hence burn when they reach the outer air outside the retort. As long as these gases arise, the temperature of the mass in the retort is to be maintained; when they cease, which is indicated by the extinction of the flame of the outlet port of the retort the reaction is complete and the heat is to be withdrawn. A further heating might injure the kieselguhr's filtering properties or destroy the thin carbon layers on the frame of its particles.

The mass is then withdrawn from the retort. If, as is frequently the case, the solution containing the organic matter, by which the kieselguhr had been permeated, previously to the distillation step of the process, contained mineral salts or other inorganic impurities, these can be removed by any customary method of removing such impurities from filtering, or decolorizing media. These methods are well known, vary with the different impurities to be removed, and need not be detailed here.

The spent material can be revived by drying it and subjecting it again to the distillation stage of the process described above. After having been so treated it is improved for a number of cycles. When deterioration begins, if at all, I can not state positively. Probably a large number of repetitions of the reviving stage would in time deteriorate the material.

I claim—

1. An improved filtering and de-colorizing material consisting of kieselguhr the porous interior structure of the particles of which are covered with a thin layer of carbon from heat-charred molasses.

2. The process of producing a filtering material for sugar solutions which comprises thoroughly permeating kieselguhr throughout its interior structure with a solution of molasses sufficiently thin to penetrate into the particles of the kieselguhr and destructively distilling this material until the organic molecules of the molasses are broken up and a thin layer of carbon is deposited throughout and upon the frame of the porous kieselguhr particles.

3. The process as described in claim 2, with the following additional step in the process:—the kieselguhr permeated with the molasses solution having been dried before this distillation, the said distillation being made substantially without access of air.

4. The process of producing a filtering material for sugar solutions which comprises thoroughly permeating kieselguhr throughout its interior structure with a solution of a product of sugar refining said product consisting substantially of a sugar compound free from starch, sufficiently thin to penetrate into the particles of kieselguhr and destructively distilling this material until the organic particles of the sugar in this material are broken up and a thin layer of carbon deposited upon the frame of the porous kieselguhr particles.

In testimony whereof I affix my signature.

WILLIAM H. HOODLESS.